US008699384B2

(12) United States Patent  (10) Patent No.: US 8,699,384 B2
Martin et al.  (45) Date of Patent: Apr. 15, 2014

(54) VOIP CONFERENCING

(75) Inventors: J. Douglas Martin, Manitou Springs, CO (US); Randolph J. Leigh, Monument, CO (US); Andrew Dionysius Ghinaudo, Colorado Springs, CO (US); Robert G. Fries, Colorado Springs, CO (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 1331 days.

(21) Appl. No.: 11/637,291

(22) Filed: Dec. 12, 2006

(65) Prior Publication Data

US 2007/0217589 A1 Sep. 20, 2007

Related U.S. Application Data

(60) Provisional application No. 60/782,569, filed on Mar. 15, 2006.

(51) Int. Cl.
*H04L 12/16* (2006.01)

(52) U.S. Cl.
USPC .......................................... 370/261; 370/352

(58) Field of Classification Search
None
See application file for complete search history.

(56) References Cited

U.S. PATENT DOCUMENTS

| 7,012,888 | B2 * | 3/2006 | Schoeneberger et al. ...... 370/217 |
| 7,012,901 | B2 | 3/2006 | Jagadeesan et al. |
| 7,075,900 | B2 | 7/2006 | Peters |
| 7,492,730 | B2 * | 2/2009 | Eshel et al. .................... 370/260 |
| 7,532,713 | B2 | 5/2009 | Norton |
| 2003/0002479 | A1 * | 1/2003 | Vortman et al. ................ 370/352 |
| 2004/0081183 | A1 * | 4/2004 | Monza et al. .................. 370/412 |
| 2004/0141508 | A1 * | 7/2004 | Schoeneberger et al. ...... 370/401 |
| 2004/0186904 | A1 | 9/2004 | Oliveira |
| 2004/0196867 | A1 * | 10/2004 | Ejzak et al. .................... 370/468 |
| 2005/0069115 | A1 * | 3/2005 | McKnight et al. ........ 379/202.01 |
| 2005/0094579 | A1 | 5/2005 | Acharya |
| 2005/0135598 | A1 | 6/2005 | Badt, Jr. et al. |
| 2005/0152336 | A1 | 7/2005 | Bratt et al. |
| 2007/0019798 | A1 * | 1/2007 | Voight et al. .............. 379/202.01 |
| 2007/0070980 | A1 * | 3/2007 | Phelps et al. .................. 370/352 |

* cited by examiner

*Primary Examiner* — Brian Roberts
(74) *Attorney, Agent, or Firm* — Smith Risley Tempel Santos LLC

(57) ABSTRACT

A VoIP-based conferencing system readily handles different protocols, load balance media resources and deals with failover situations. The VOIP conferencing system has a gateway coupled to the PSTN (Public Switched Telephone Network). A Voice Server Director (VSD) is coupled to the gateway and performs the control function of the conferencing system. The VSD has a back-to-back user agent. The VSD controls a media server, which mixes the audio (signals), and the media server receives the data portion of a conference call from the gateway. The media server is coupled to a bridge that controls an on-going conference.

8 Claims, 5 Drawing Sheets

VOIP CONFERENCING

RELATED APPLICATIONS

The present invention claims priority on provisional patent application Ser. No. 60/782,569, filed on Mar. 15, 2006, entitled "VoIP Conferencing" and is hereby incorporated by reference.

FIELD OF THE INVENTION

The present invention relates generally to the field of teleconferencing and more particularly to VOIP-based (Voice Over Internet Protocol) conferencing systems.

BACKGROUND OF THE INVENTION

VOIP (Voice Over Internet Protocol) provides a significant cost advantage over standard PSTN (Public Switched Telephone Network). In addition, it is easier to add features to VOIP systems than PSTN systems. This trend is extending into teleconferencing systems. However, using the same techniques for VOIP conferencing as are presently used for PSTN conferencing would unnecessarily limit VOIP conferencing systems, particularly in regard to reliability-enhancing features such as load balancing amongst conferencing equipment and recovering from equipment failures.

Thus, there exist a need for VOIP conferencing system that takes advantage of the features that can be provided by using networking, including the internet.

SUMMARY OF INVENTION

The present invention is a conferencing system that is based on VoIP internally and can easily handle different protocols, load balance among multiple applications servers and media resources, and deal with failure situations. The conferencing system can include a gateway coupled to the PSTN (Public Switched Telephone Network), thereby maintaining a conventional service access method for traditional PSTN callers. The present implementation of the invention employs SIP as the internal call-control protocol, but other protocols could be employed, either instead of SIP or in addition to SIP.

All externally-originated calls, whether of PSTN origin or native VoIP, communicate over SIP to the conferencing system through one or more proxy server(s). The proxy identifies new call requests and initially forwards these to a Voice Services Director (VSD) application, with the proxy performing load-balancing among several available VSD instances. The VSD validates the caller and/or identifies the desired conference by using interactive voice response (IVR) mechanisms. The VSD uses a back-to-back user agent (B2BUA), employing SIP as the call-control protocol, to control a media server which plays voice prompts to the caller and performs DTMF detection functions. The use of a B2BUA decouples the caller from the specific media server resource used by the VSD, allowing the VSD to utilize any media server resource that is available. The caller's call-control terminates at the VSD, while the VSD independently manages the media server resource that is assigned to handle the caller's separate media stream(s).

After the VSD, in conjunction with a media server resource, has collected necessary information from the caller, the VSD checks with the back-office servers to find out if the passcode is valid, and if so, where to send the caller next. If this is the first caller for the conference, the back-office will use a load-balancing algorithm to determine on which bridge to start the conference. If, on the other hand, the conference has already started, the back-office will identify which bridge the conference is running on. This bridge-selection information is passed back to the VSD, which then transfers the caller to the desired bridge.

Bridge software, which also employs a B2BUA, acts as the conference 'bridge', controlling the conference and the individual callers at a high level, while the low-level media operations (such as audio mixing, prompt playing, and DTMF detection) are performed on a media server resource that is being controlled by the bridge software application. A given bridge software application may control multiple media server resources, and a given media resource may be utilized by one or more VSD or bridge software applications. When the VSD transfers the caller, information about the caller and their desired action (i.e. join a specific conference) is included in the transfer request itself. Specifically, the phone number and/or IP address of the caller, the conference passcode, the dialed number and other information is passed in 'cookie' parameters of the SIP REFER command. The use of this mechanism eliminates the need for passing this necessary information between the VSD and the bridge software application through an 'out-of-band' mechanism, while clearly linking the information to that specific caller.

The system may be distributed so that the proxy, media server, conference control ('conference bridge') application, back-office servers and voice services director may be in different locations. This provides a mechanism for switching to alternate resources if a specific resource fails or becomes full or overloaded. If a given media server resource becomes full, a VSD or 'bridge' may make use of additional media servers. For 'bridges', it may also become necessary to link the media of multiple media servers together to expand existing conferences or to allow larger conferences than could normally be handled on a single media server resource. It is also advantageous to link multiple 'bridge' applications together for handling a single conference, with each bridge controlling their own media resource, rather than controlling many media server resources from a single 'bridge' application as this may overload a single instance. In this case, the bridge applications interact at a higher, more abstracted level than the detailed level required to manage a media server resource directly.

The system can also originate calls, referred to as dial-outs, to either PSTN or VoIP endpoints. If the call is being made through a gateway, the SIP INVITE message will contain the destination phone number or contact information.

DETAILED DESCRIPTION OF THE DRAWINGS

The present invention is a VOIP conferencing system that can readily handle different protocols, load balance resources and deal with fail-over situations. A number of terms are used in the present application that may be unfamiliar. As a result, a list of some of the terms used in the application and a representative definition are provided to help clarify these terms. The definitions should be considered representative but not limiting.

Gateway—a device that converts one incoming protocol to a different outgoing protocol.

SIP—Session Initiation Protocol defined in IETF RFC 3261: Internet Engineering Task Force—Request For Comment 3261.

Proxy Server—A device or application running on a computer that acts a consolidation point of contact.

VSD—Voice Services Director. An application running on a computer that interacts with a caller and provides a greeting and authentication.

UA—User Agent, which is defined in the IETF RFC 3261: Internet Engineering Task Force—Request For Comment 3261. The User Agent acts as an end or origination point for SIP messages.

Media Server—An application running on a computer that mixes various audio signals and other data related messages.

Bridge—An application running on a computer that manages media servers and conferences.

APS—Advanced Protocol Server. A message router for inter-application messages.

DDS—Dialog Database Server. An application server managing conference reservations.

ACS—Active Conference Server. An application that maintains the real time conference state, selects media servers, bridges and provides load balancing of available resources.

Figure 1:
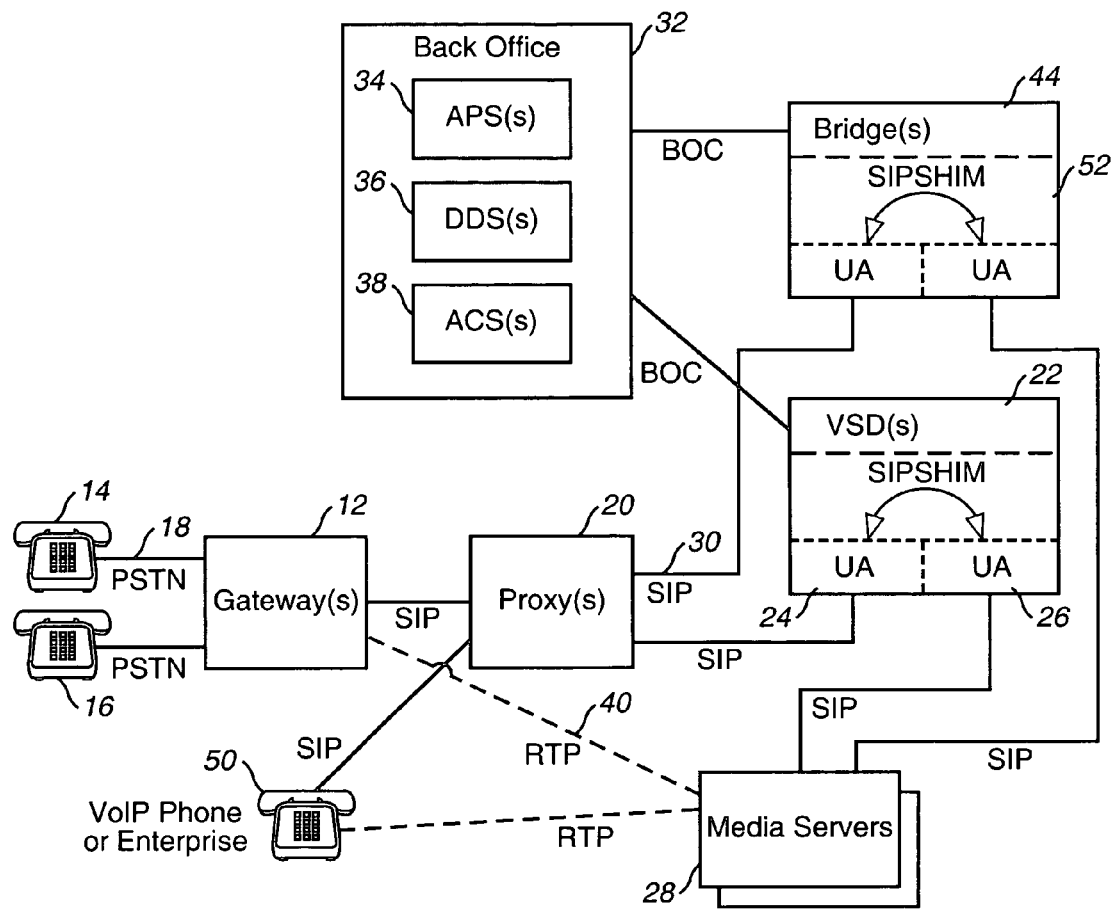
FIG. 1 is a block diagram of a VOIP conferencing system in accordance with one embodiment of the invention.

FIG. 1 is a block diagram of a VOIP conferencing system 10 in accordance with one embodiment of the invention. Any or all of the applications and/or servers in the following description can be single, clustered or load balanced to allow scaling up the system capacity and/or improving system reliability and/or improving system response times. The system has a gateway (GW) 12; this is coupled to a telephone 14, 16 through the PSTN (Public Switched Telephone network) 18. The telephones 14, 16 use a public switched telephone network format. The gateway 12 converts the PSTN format of the call into a control portion, usually SIP (Session Initiation Protocol) or control portion, and a media portion, usually RTP (Real Time Protocol). The gateway connects to a proxy 20 through a network such as the internet, a LAN or a WAN. The proxy 20 passes the SIP information to the VSD (Voice Services Director) 22. The VSD 22 has a back-to-back user agent (UA) 24, 26. One user agent 24 acts as the termination point for the original call, while the other user agent 26 communicates with and controls media server resources 28. The VSD also communicates with back office servers 32 using some back-office communication protocol (BOC), either through the B2BUA (back-to-back user agent) or through another mechanism and/or protocol. The back office 32 has a number of control services including the Advanced Protocol Server (APS) 34, which routes back-office messages, the Dialog Database Server (DDS) 36, which holds conference information and validates user passcodes, and the Active Conference Server (ACS) 38, which tracks information about active conferences. Note that the ACS 38 assigns conferences to various bridges and also load balances between the bridges. Once a media server 28 is designated for a particular conference, the RTP media 40 is routed from the gateway 12 to the media server 28. The media server 28 does the voice (audio, video or real-time data) mixing. Note that each media server may have a number of blades, each further having a number of ports. As a result, a given media server may perform audio mixing for a number of conferences. The media servers 28 are connected to the bridge application (conferencing bridges, or just 'bridges') 44. A bridge 44 performs the control functions for an active conference, including functions like muting, recording and conference creation and destruction. If a user is using a computer 50 or a VoIP hard phone as their telephone they can connect directly to the proxy 20 that then routes the SIP and the RTP portions of the call to the appropriate places. The telephone 50 employs a VoIP connectivity rather than PSTN.

The bridge 44 is SIP-protocol 30 enabled. The SIPShim (a control layer) 52 is an implementation of a B2BUA, allowing the bridge application 44 to interact with the caller and the media server resources through generic higher-level commands rather than dealing directly with SIP protocol and SIP signaling events.

When a PSTN user calls into a conference, the call is routed through a gateway 12, through the proxy 20 and to the VSD 22. The VSD 22 plays a greeting and asks the user for a passcode. Different passcodes may be used to differentiate the conference leader for a given conference, as well as to select a particular conference. These passcodes are validated by the DDS 36 at the request of the VSD 22. Based on the DNIS, ANI, passcode, or any combination of these (customer defining code), a specific greeting may be selected by the VSD, rather than playing a generic greeting. Next, the VSD asks the ACS 38 which bridge 44 the conference is assigned to. The VSD 22 then transfers the caller to the appropriate conferencing bridge, where the caller's media is joined to a conference.

The back-to-back user agents 24, 26 allow the system to handle failures in conferencing resources. The call from the telephone 14 is terminated at the first user agent 24. If a media server 28 stops functioning or gives indication of a pending failure (failure mode), the second user agent 26 is instructed to reroute the call to another media server resource. The back-to-back user agents 24, 26 also allow the system to handle different protocols. The first user agent 24 generally receives SIP protocol information, but the second user agent 26 can use a different protocol if that is convenient. This allows the system 10 to interoperate between resources that use differing protocols.

Note that those systems connected to the SIP/BOC channels can be considered part of the conference control system while those systems connected to the RTP or media data streams can be considered to be part of the data portion of the conference system.

Figure 2:
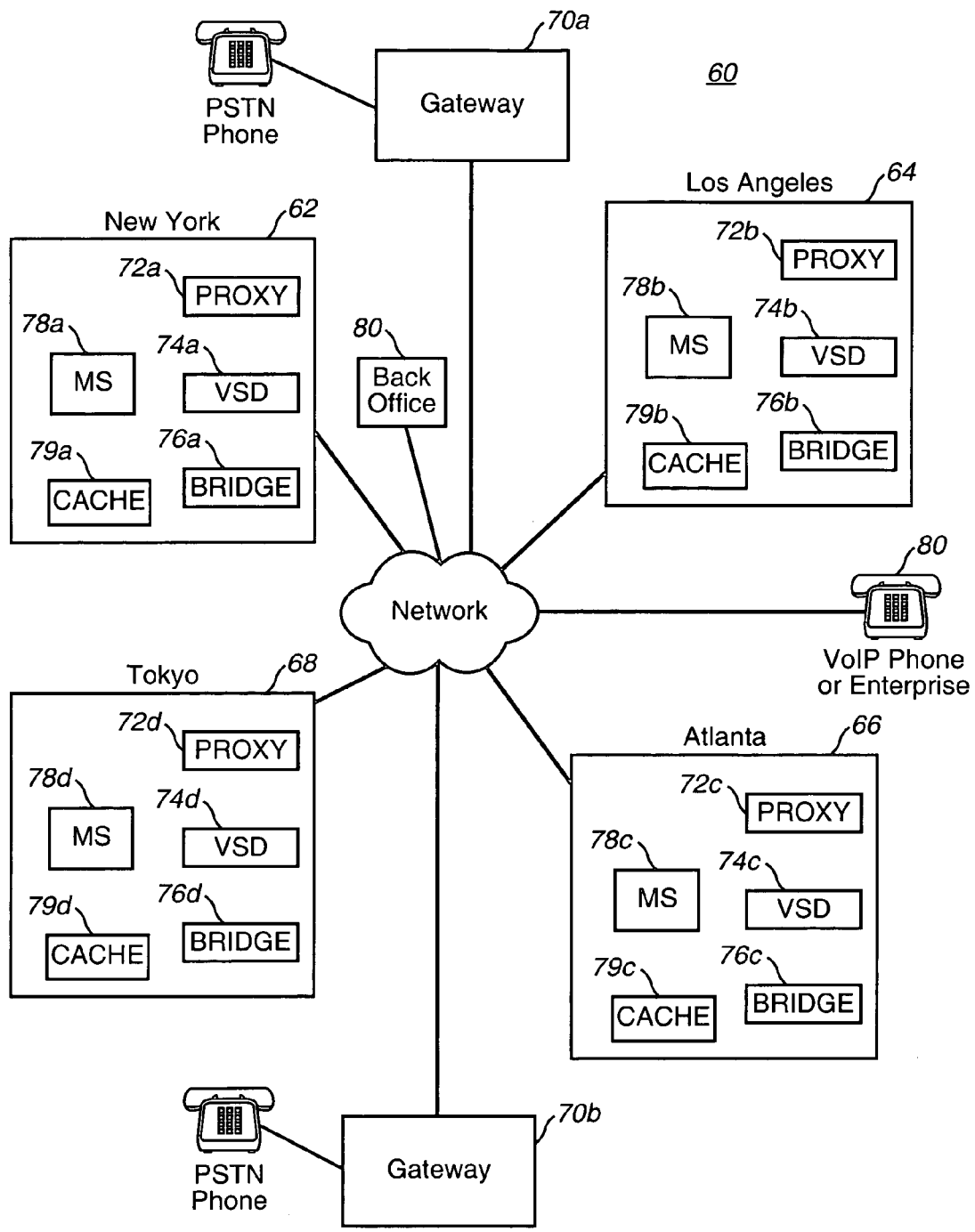
FIG. 2 is a block diagram of a distributed VOIP conferencing system in accordance with one embodiment of the invention.

FIG. 2 is a block diagram of a distributed VOIP conferencing system 60 in accordance with one embodiment of the invention. The conferencing system 60 is similar to that shown in FIG. 1 except that this system is distributed and has multiple instances of a system like that of FIG. 1. A number of conference centers 62, 64, 66, 68 are located around the country or the world. Each conference center 62, 64, 66, 68 is coupled to a network such as the internet. One or more gateways 70a, b can also be coupled to this network, and VoIP phones or VoIP-based enterprises 80 can tie in to the system. Each conference center would typically have one or more of a proxy 72a-d, a VSD 74a-d, a bridge 76a-d and a media server 78a-d. A software based distributed cache 79a-d or other information-sharing mechanism (such as Back Office 80) is made available to all VSDs(a-d) and provides shared information about the ongoing conferences and the resources that are available. The caches 79a-d shares this information through the network 82. A call may arrive at the proxy 72b in LA 64 and be routed to the VSD 74a in New York 62. The VSD 74a may select the media server 78d in Tokyo 68 and a bridge 76c in Atlanta 66. This allows the proxy 72, VSD 74 and bridge 76c to load balance all available resources across the network 60. In addition, in a fail-over situation the VSD 74a in New York can detect that the bridge 76d in Tokyo is not responding. Under these circumstance, the VSD can redirect the conference to bridge 76c in Atlanta.

Figure 3:
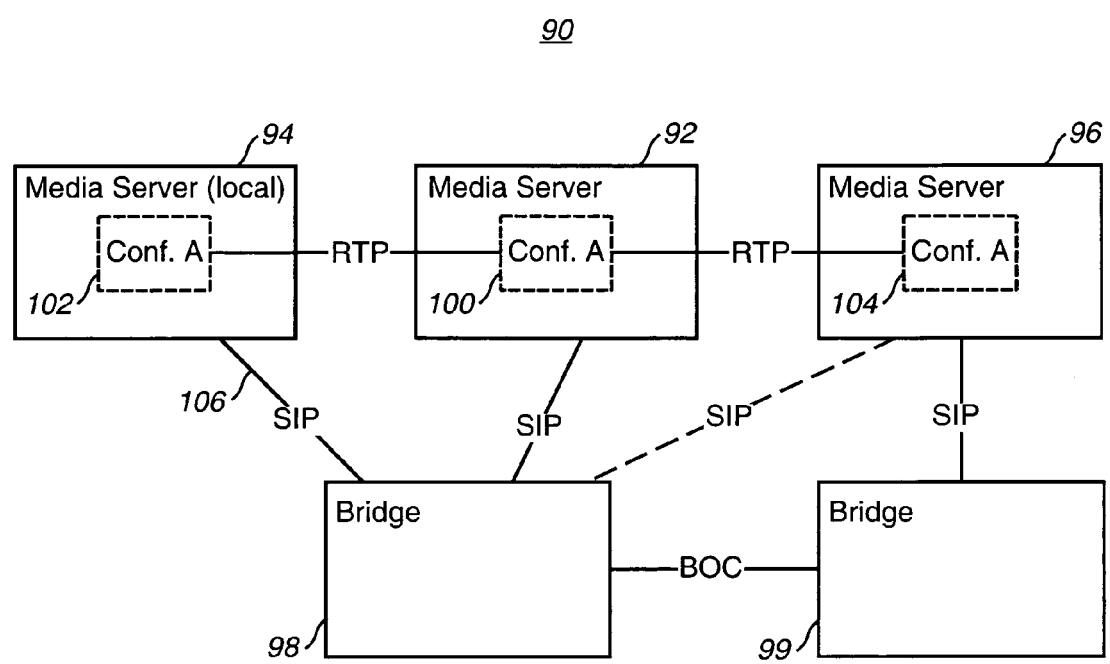
FIG. 3 is a block diagram of a distributed conference using a distributed VOIP conferencing system in accordance with one embodiment of the invention.

FIG. 3 is a block diagram of a distributed conference using a distributed VOIP conferencing system 90 in accordance with one embodiment of the invention. This figure shows how distributed resources may be shared. The system 90 has three media servers 92, 94, 96 that each provide many, perhaps 1000 or more, conferencing port resources. In an open conference the number of participants can be any number up to a maximum number. Assume that a conference 100 starts on media server 92. Five minutes into that conference, only 10 ports are left unused on media server 92 but 20 new people want to join that conference. These people can be allocated to other media servers. For instance, 11 ports 102 can be used in media server 94 and 11 ports 104 can be used in media server 96. Two additional conference ports will be required from the original conference and media server 92 to link the RTP or media to the other two media servers, which each use one media (RTP) linking port in addition to their 10 callers. A single bridge 98 may control all three media servers 92, 94, 96 and the three conferences 100, 102, 104 through SIP 106 or another protocol, even if one or more media servers are located in a remote location relative to the bridge's location. Conference bridge applications may also be linked at a high level, where each bridge 98, 99 controls its own media server resources, and are linked through some form of back-office communications (BOC) which could include SIP. Conference media (RTP) linking is typically initiated from one bridge that acts as a parent, with multiple subordinate or child conferences being instantiated on the other media servers and possibly also on other bridges.

This approach minimizes audio latency by having a common focal point for all child conferences to converge. However, this approach requires more 'linking' ports on the parent conference. Hence, the initial conference may be deprecated to be a child conference, while the second conference is assigned to be the parent (or step-parent), and thus the media for all conferences is linked to the second conference as the focal point. When instantiating the second conference, sufficient ports may be reserved to allow linking further child conferences in the future.

This approach of linking conferences also applies where large numbers of callers are located in different geographical regions, such as Asia and Europe, or possibly on different types of networks such as a combination of standard VoIP network and a proprietary network such as Skype, but these need to be linked together. Rather than having all callers connect to a single location, each region or network could connect to a regional bridge, then the bridges and the media are linked together. This minimizes audio latency for callers in the same region, and may also reduce media transport and/or conversion costs. Each region or network could also use parent and child conferences as needed, and only the two parent (or step-parent) conferences in different regions or networks would have their media linked together.

Figure 4:
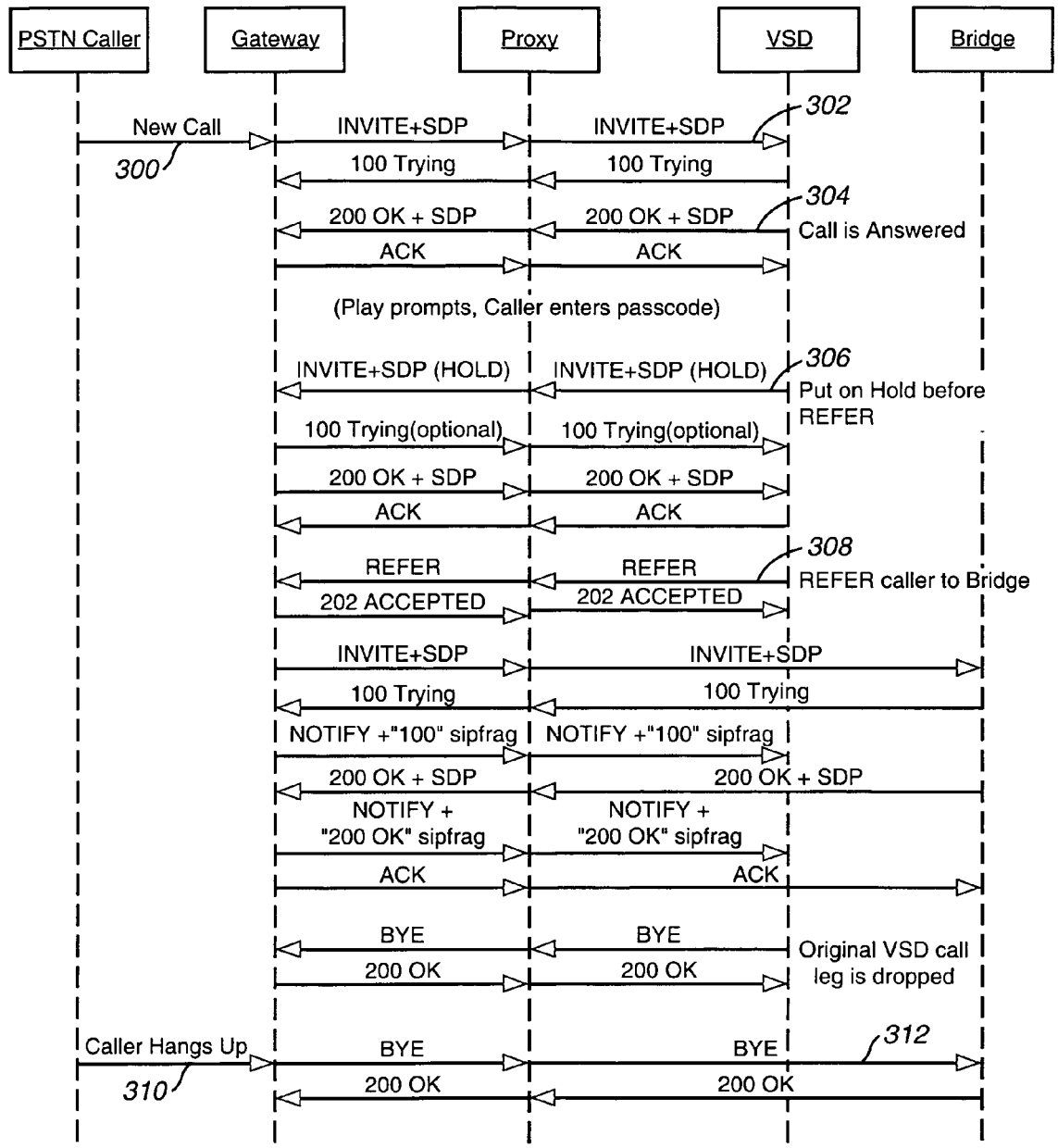
FIG. 4 is a call flow diagram for a typical PSTN conference participant in accordance with one embodiment of the invention.

FIG. 4 is a call flow diagram for a typical PSTN conference participant in accordance with one embodiment of the invention. A gateway (GW) receives an incoming call 300 from the PSTN. The gateway converts the PSTN call into a control (SIP) portion and media (RTP) portion. FIG. 4 only shows the SIP portion of the call that is coupled to the gateway; the SIP for the media server is not shown. The RTP is also not shown in FIG. 4, as this diagram details the control messaging (SIP) and not the media. The proxy forwards the control portion of the incoming call 302 to a VSD. The VSD answers the call 304, then plays one or more prompts to the caller requesting them to enter a passcode. After the caller enters the necessary information by DTMF, by speaker-independent voice recognition, or by other means, the media for the original call is put on hold 306. Next, the VSD checks with the back-office system to see if the passcode is valid, and if so, the caller is transferred 308 to a bridge as specified by the back-office system. When the caller hangs up 310, the gateway informs the bridge of this event 312 and the call is thereby terminated at both ends.

During the call, the state of the conference and of individual users can be controlled through DTMF by the caller, or from any other mechanism that allows a user to access the bridge directly or indirectly, such as a web-based interface that ties to the bridge through the back office. The bridge will subsequently control the media server(s) in use.

For both the VSD and the conferencing bridge, when the caller presses a digit on his phone the digit press may be passed on as in-band tones within the RTP audio media stream, or may optionally be converted by the gateway to a telephony event signaling protocol that is carried inside the RTP. In either case, the digit press is detected by the media server and reported to the VSD or bridge application. The above describes the basic call flow of typical conference user.

Figure 5:
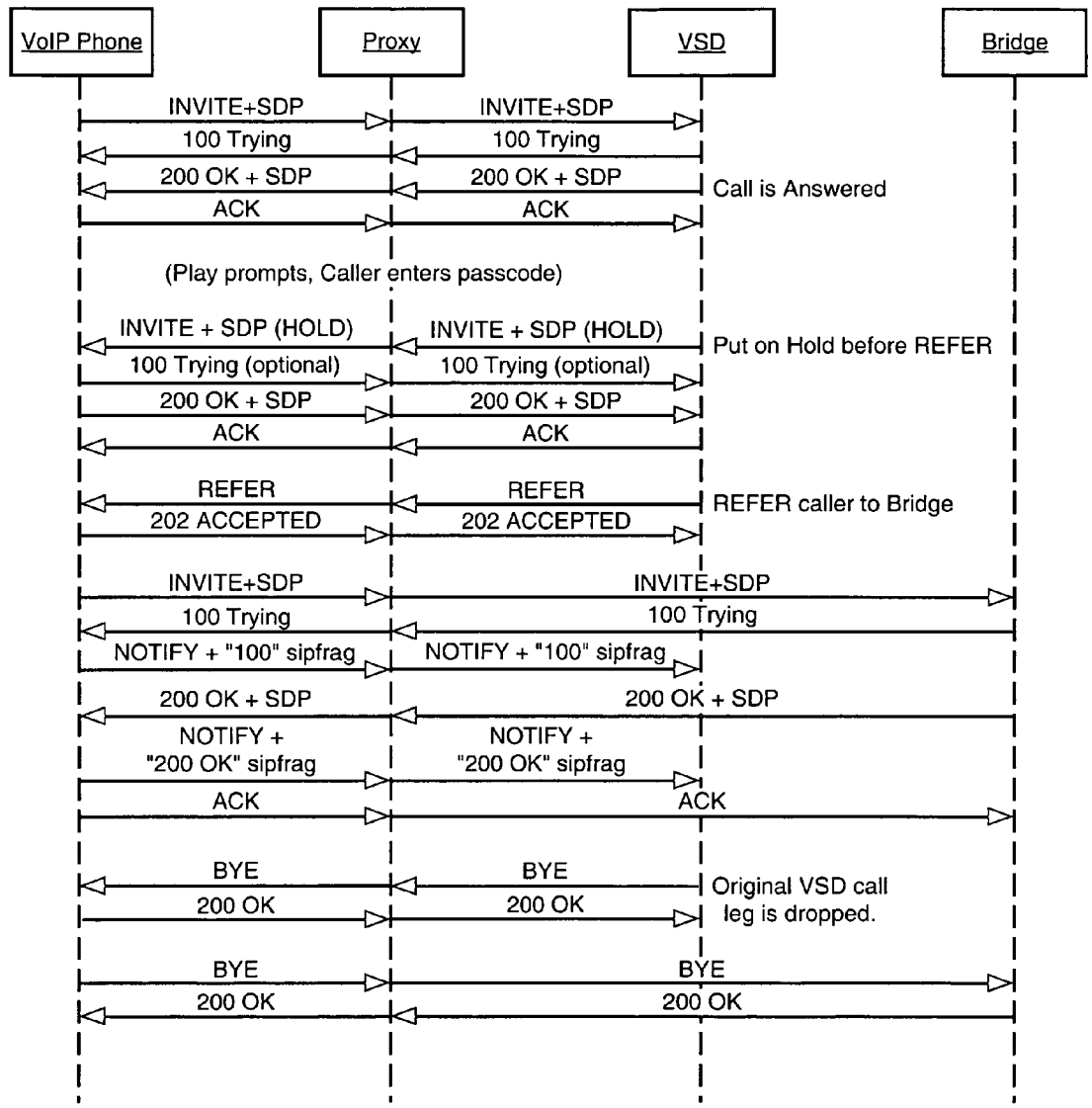
FIG. 5 is a call flow diagram for a typical native VOIP conference participant in accordance with one embodiment of the invention.

FIG. 5 shows the identical call flow from FIG. 4, but with a native VoIP call origination rather than PSTN. The main difference is that a gateway is not required.

Variations of these flows are also needed to handle error conditions that may occur, such as a bridge failing to answer when a caller is transferred to it. These have been omitted for clarity.

Below is a list of SIP commands shown in FIGS. 4 & 5.
SIP: Session Initiation Protocol, as defined primarily by IETF Standard RFC3261.
SIP is an application-layer control protocol that can establish, modify, and terminate multimedia sessions such as Internet telephony calls.
INVITE: a SIP Request method used to set up (initiate) or modify a SIP-based communication session (referred to as a SIP 'dialog').
SDP: Session Description Protocol. An IETF protocol that defines a text-based message format for describing a multimedia session. Data such as version number, contact information, broadcast times and audio and video encoding types are included in the message.
ACK: Acknowledgement. A SIP Request used within the SIP INVITE transaction to finalize the establishment or renegotiation of a SIP session or 'dialog'.
100, 200, 202: SIP Response codes that are sent back to the originator of a SIP request. A response code indicates a specific result for a given request.
NOTIFY: a SIP Request method that is used to convey information to one SIP session about the state of another SIP session or 'dialog'.
REFER: a SIP Request method that is used to transfer one end of a SIP session to a different SIP destination.
Sipfrag: SIP fragment. A fragment of a SIP message (such as a Response code) from another SIP session, that is sent as part of the body of a SIP NOTIFY message.
BYE: a SIP Request method that is used to terminate an existing SIP session or 'dialog'.

Thus there has been described a VOIP conferencing system that can easily handle different protocols, load balance media resources and deal with a fail-over situation.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of operating a conferencing system, comprising the steps of:
   dividing an incoming call to a conference call between a plurality of callers into a first control data stream and a media data stream;
   terminating the first control data stream at a first user agent of a voice services director; and
   in the voice services director, originating a second control data stream at a second user agent of the voice services director, wherein the first user agent communicates with a proxy and the second user agent communicates with a first media server;
   in the proxy, providing a third control data stream;
   terminating the third control data stream at a first user agent of a first bridge application;
   originating a fourth control data stream at a second user agent of the first bridge application to communicate with the first media server; and
   linking the first bridge application to a second bridge application controlling a second media server.

2. The method of claim 1, further comprising:
   directing the media data stream to one of the first and second media servers.

3. The method of claim 2, further comprising:
   receiving a passcode from the incoming call at the voice service director; and
   checking if the passcode is valid with a dialog database server.

4. The method of claim 3, further comprising:
   when the passcode is valid, redirecting the first control data stream to the first user agent of the first bridge application; and
   connecting a second user agent of the first bridge application to the first media server.

5. The method of claim 4, further including the step of:
   connecting the second user agent of the first bridge application to a second media server.

6. The method of claim 5, further comprising:
   determining if one of the first and second media servers is in a failure mode; and
   when one of the first and second media servers is in the failure mode, rerouting the second control data stream to the other of the first and second media servers.

7. The method of claim 1, wherein the incoming call is received via one of a PSTN connection or a VoIP connection.

8. A method of operating a conference call between a plurality of callers in a conferencing system, comprising the steps of:
   dividing an incoming call to a conference call between a plurality of callers into a control data stream and a media data stream;
   using a first user agent element of a voice services director to communicate a unique greeting, based on a customer defining code;
   forwarding the control data stream to multiple bridge applications for managing the conference call, each bridge application controlling an associated media server; and
   communicating the media data stream to one of the associated media servers.

* * * * *